United States Patent
Sugimoto et al.

(10) Patent No.: US 10,757,272 B2
(45) Date of Patent: Aug. 25, 2020

(54) VIRUS CHECK METHOD AND INFORMATION PROCESSING DEVICE, IMAGE FORMING DEVICE, AND IMAGE FORMING SYSTEM THAT PERFORM THE VIRUS CHECK METHOD

(71) Applicant: Konica Minolta, Inc., Tokyo (JP)

(72) Inventors: Hiroaki Sugimoto, Nagoya (JP); Takeshi Hibino, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/374,562

(22) Filed: Apr. 3, 2019

(65) Prior Publication Data
US 2019/0327368 A1 Oct. 24, 2019

(30) Foreign Application Priority Data
Apr. 18, 2018 (JP) .................................. 2018-79655

(51) Int. Cl.
*H04N 1/00* (2006.01)
*G06F 21/56* (2013.01)

(52) U.S. Cl.
CPC ......... *H04N 1/00244* (2013.01); *G06F 21/56* (2013.01); *H04N 1/00137* (2013.01); *H04N 1/00167* (2013.01)

(58) Field of Classification Search
CPC ........... H04N 1/00244; H04N 1/00137; H04N 1/00167; G06F 21/56
See application file for complete search history.

(56) References Cited

U.S. PATENT DOCUMENTS

| 6,611,925 | B1 * | 8/2003 | Spear | G06F 21/562 |
| | | | | 714/38.14 |
| 6,622,150 | B1 * | 9/2003 | Kouznetsov | G06F 21/56 |
| 8,244,997 | B2 * | 8/2012 | Teranishi | G06F 21/564 |
| | | | | 711/161 |
| 8,561,190 | B2 * | 10/2013 | Marinescu | G06F 21/56 |
| | | | | 726/24 |
| 2003/0070087 | A1 * | 4/2003 | Gryaznov | G06F 21/56 |
| | | | | 726/24 |
| 2004/0230318 | A1 * | 11/2004 | Shimizu | G06F 21/56 |
| | | | | 700/1 |
| 2005/0132184 | A1 * | 6/2005 | Palliyil | G06F 21/56 |
| | | | | 713/152 |

(Continued)

FOREIGN PATENT DOCUMENTS

| JP | 2007-200102 A | 8/2007 |
| JP | 2014-112322 A | 6/2014 |

OTHER PUBLICATIONS

Extended European Search Report issued in corresponding European Patent Application No. 19166768.2 dated Sep. 16, 2019 (7 pages).

*Primary Examiner* — Juan M Guillermety
(74) *Attorney, Agent, or Firm* — Osha Liang LLP

(57) ABSTRACT

An information processing device includes: a storage that stores data; and a hardware processor. The hardware processor: receives the data and stores the data in the storage; checks the data for viruses when the data is received; sends the data stored in the storage to an external device; determines whether the data has been checked for viruses when the data is sent to the external device; and adds, upon determining that the data has been checked for viruses, checked information to the data to be sent.

17 Claims, 10 Drawing Sheets

(56) References Cited

U.S. PATENT DOCUMENTS

| | | | | |
|---|---|---|---|---|
| 2008/0163372 A1* | 7/2008 | Wang | ............ | G06F 21/56 |
| | | | | 726/24 |
| 2008/0184372 A1* | 7/2008 | Hoshina | ............ | G06F 21/564 |
| | | | | 726/24 |
| 2011/0032567 A1* | 2/2011 | Ishida | ............ | G06F 21/56 |
| | | | | 358/1.15 |
| 2011/0067100 A1* | 3/2011 | Fukuoh | ............ | G06F 21/56 |
| | | | | 726/24 |

* cited by examiner

STORAGE DEVICE 3

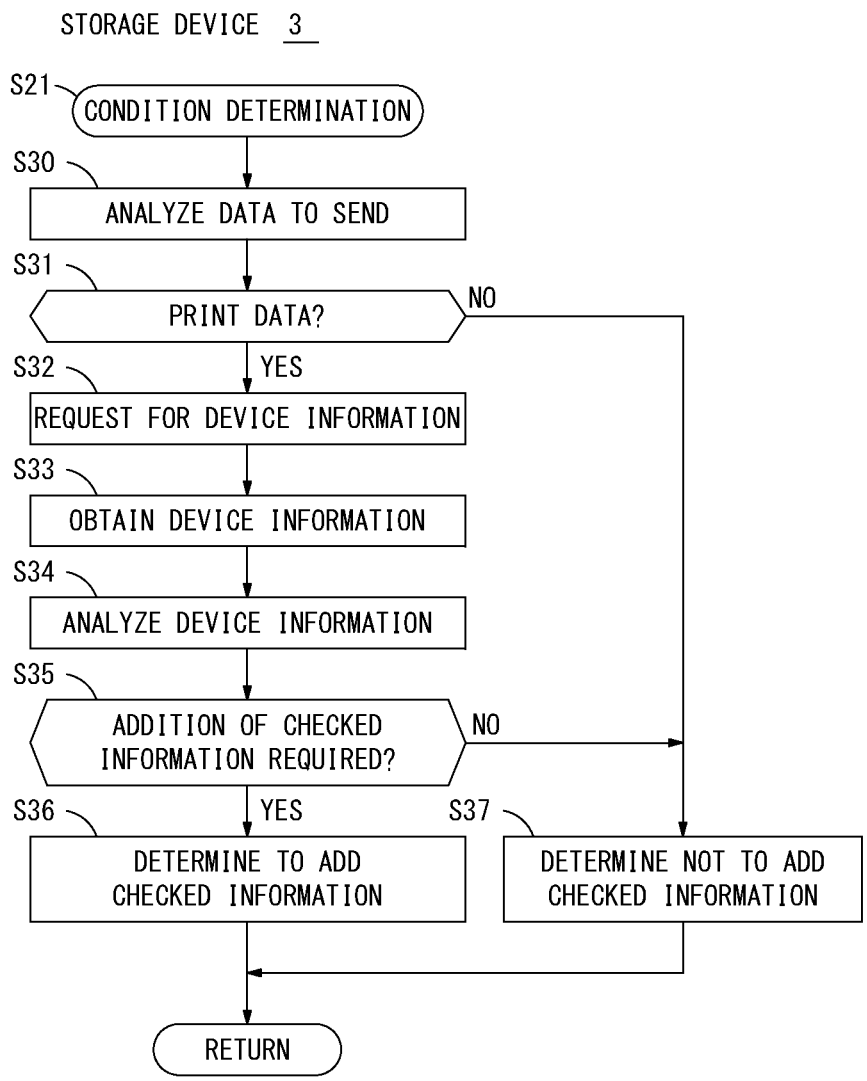

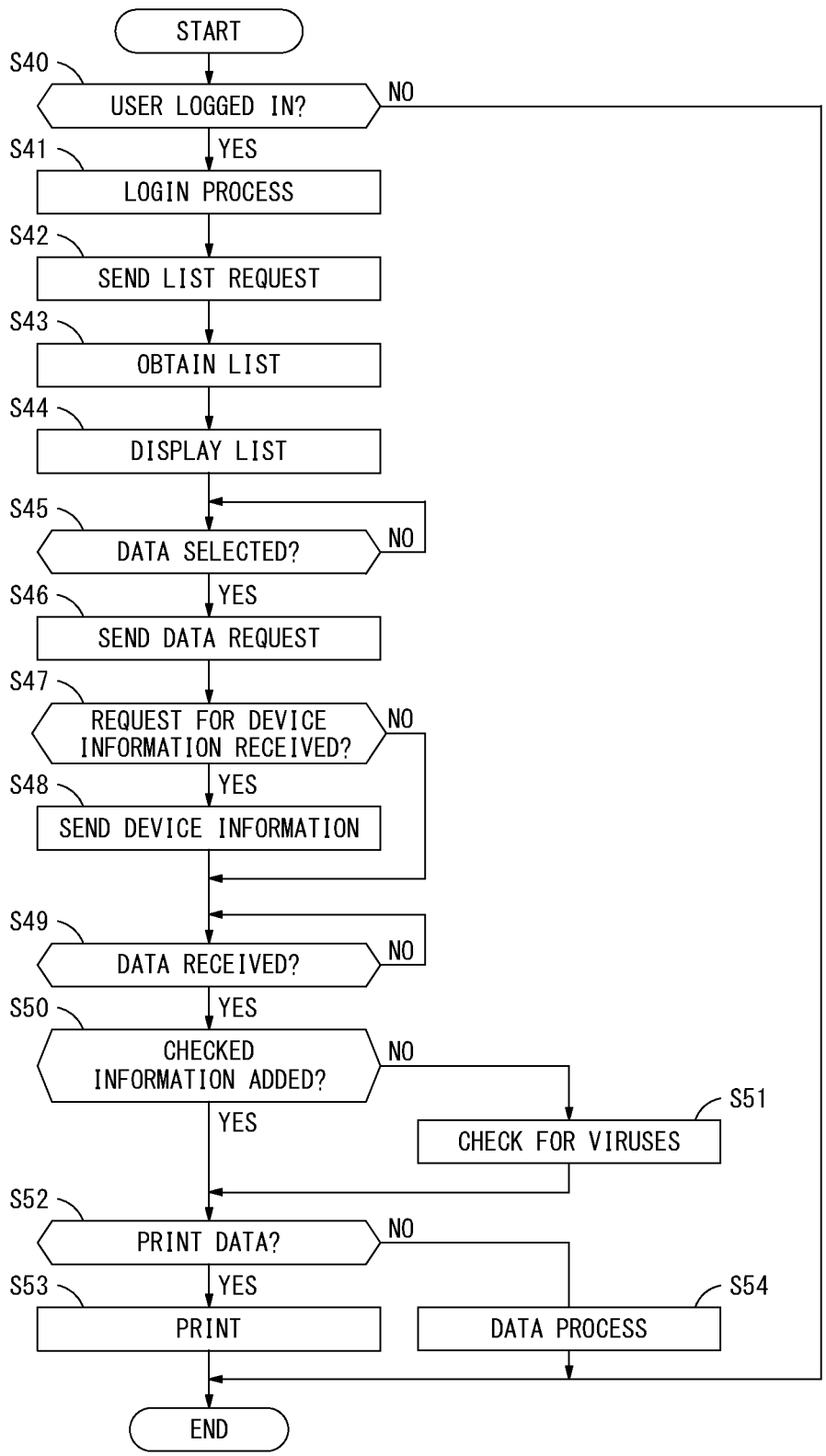

VIRUS CHECK METHOD AND INFORMATION PROCESSING DEVICE, IMAGE FORMING DEVICE, AND IMAGE FORMING SYSTEM THAT PERFORM THE VIRUS CHECK METHOD

CROSS-REFERENCE TO RELATED APPLICATIONS

This application claims priority from Japanese patent application No. 2018-079655, filed on Apr. 18, 2018, the entire contents of which is incorporated herein by reference in its entirety.

TECHNICAL FIELD

The present invention relates to an information processing device, an image forming device, an image forming system and a virus check method. The present invention more specifically relates to a technique for checking for viruses on the image forming device.

BACKGROUND

Information processing terminals such as personal computers (PC) generally check data received over a network for viruses. In these years, image forming devices so called MFPs (Multifunctional Peripherals) equipped with virus check function have become popular in view of security. When receiving data such as print data over the network, the image forming device checks the received data for viruses.

It, however, takes time for check for viruses if every data received by the image forming device is checked for viruses in real time. It takes time until starting printing based on the print data when the print data is received by the image forming device.

The data once checked for viruses may again be checked for viruses at the information processing terminal. In this case, the information processing terminal determines if data such as a virus definition file is rewritten to latest data. Only if the data such as the virus definition file is rewritten to the latest data, the data is checked again for viruses. This known technique is introduced for example in Japanese Patent Application Laid-Open No. JP 2007-200102 A. According to the known technique, when the data such as a virus definition file is not rewritten to the latest data, the data is not checked again for viruses. This saves time required for the second check for viruses.

According to the known technique, the information processing terminal once checks the data received over the network for viruses, and the second or later check for viruses is omitted. To be more specific, the above-described known technique does not enable to omit the first check for viruses which is carried out in response to the receipt of the data over the network. Even by applying the above-described known technique, time from receipt of the print data to start of a process to produce a printed output cannot be shortened.

SUMMARY

One or more embodiments of the present invention provide an information processing device, an image forming device, an image forming system and a virus check method capable of shortening time until the image forming device starts producing a printed output by omitting a virus check process without lowering security.

First, one or more embodiments of the present invention are directed to an information processing device.

According to one or more embodiments of the present invention, the information processing device comprises: a storage in which data is stored; and a hardware processor that: receives the data and stores in the storage; checks the data for viruses when the data is received; sends the data stored in the storage to an external device; determines whether or not the data has been checked for viruses when the data is sent to the external device; and adds checked information to the data to be sent when determining that the data has been checked for viruses.

Second, one or more embodiments of the present invention are directed to an image forming device.

According to one or more embodiments of the present invention, the image forming device comprises: a hardware processor that: receives data; produces a printed output based on the received data; checks the received data for viruses; and determines whether or not checked information is added to the received data when the data is received, and checks for viruses if the checked information is not added and omits the check for viruses if the checked information is added.

Third, one or more embodiments of the present invention are directed to an image forming system comprising an information processing device and an image forming device that are enabled to communicate with each other over a network.

According to one or more embodiments of the present invention, the image forming system comprises the information processing device and the image forming device, wherein the information processing device including: a storage in which data is stored; and a first hardware processor that: receives the data and stores in the storage; checks the data for viruses when the data is received; sends the data stored in the storage to the image forming device; determines whether or not the data has been checked for viruses when the data is sent to the image forming device; and adds checked information to the data to be sent when determining that the data has been checked for viruses, and the image forming device including: a second hardware processor that: receives the data; produces a printed output based on the received data; checks the data for viruses when the data is received; and determines whether or not the checked information is added to the data when the data is received, and checks for viruses if the checked information is not added and omits the check for viruses if the checked information is added.

Fourth, one or more embodiments of the present invention are directed to a virus check method applied at an image forming system that comprises an information processing device and an image forming device that are enabled to communicate with each other over a network.

According to one or more embodiments of the present invention, the virus check method comprises the steps of: determining whether or not data to be sent is checked by the information processing device for viruses when the data is sent to the image forming device from the information processing device; adding checked information by the information processing device to the data to be sent when it is determined that the data has already been checked for viruses; determining by the image forming device whether or not the checked information is added to the data which is received by the image forming device when the data sent from the information processing device is received by the image forming device; and checking the received data for viruses when it is determined that the checked information is not added, and omitting the check on the received data for viruses when it is determined that the checked information is added.

BRIEF DESCRIPTION OF DRAWINGS

The advantages and features provided by one or more embodiments of the invention will become more fully understood from the detailed description given herein below and the appended drawings which are given by way of illustration only, and thus are not intended as a definition of the limits of the present invention.

FIG. 9 illustrates a flow diagram explaining an exemplary procedure of a condition determination in detail according to one or more embodiments; and FIG. 10 illustrates a flow diagram explaining an exemplary procedure of a process performed at the client device according to one or more embodiments.

DETAILED DESCRIPTION

Hereinafter, embodiments of the present invention will be described with reference to the drawings. However, the scope of the invention is not limited to the disclosed embodiments.

Figure 1:
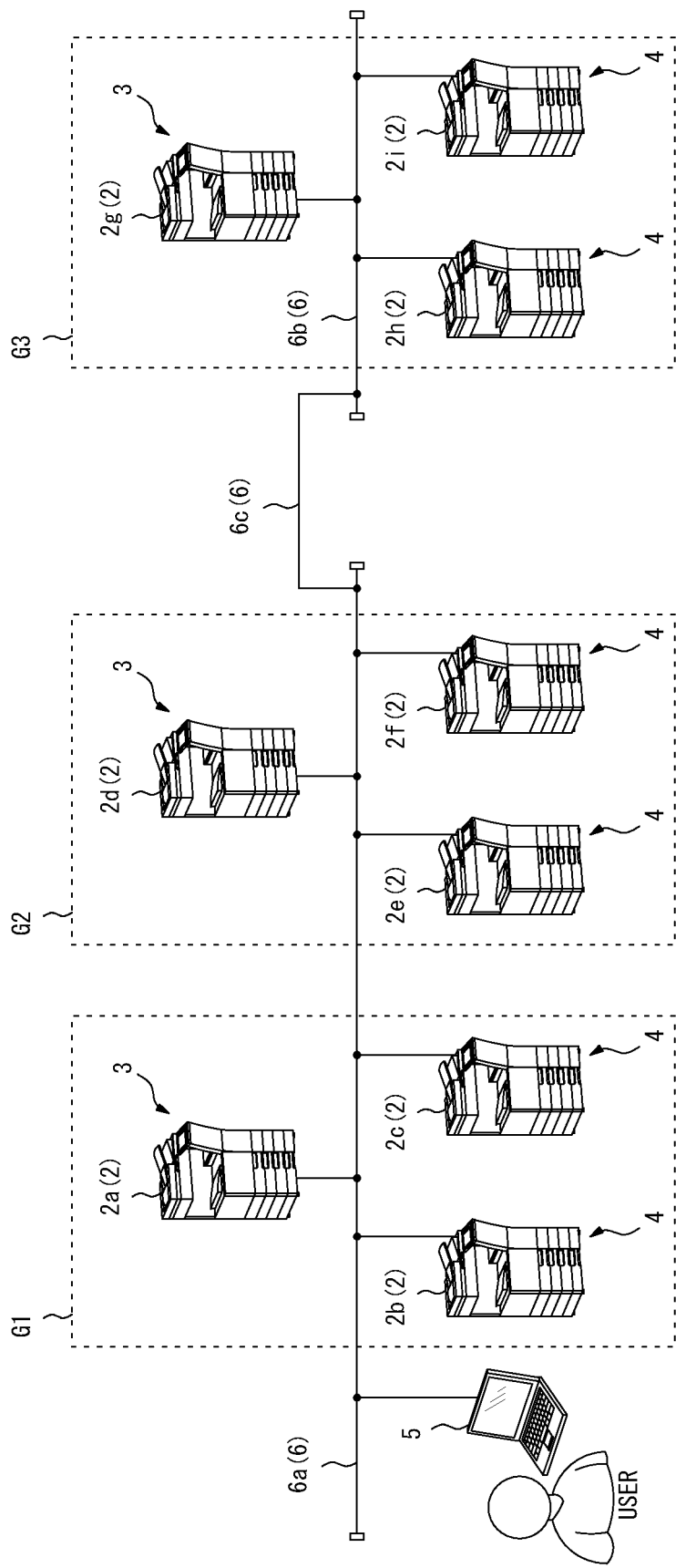
FIG. 1 illustrates an exemplary configuration of an image forming system according to one or more embodiments.

FIG. 1 illustrates an exemplary configuration of an image forming system 1 in which one or more embodiments of the present invention may be practiced. The image forming system 1 includes multiple image forming devices 2 connected to each other over a network 6. The image forming device 2 may be one of MFPs, for example, including multiple functions such as a scan function, a print function, a copy function and/or a fax function. In response to receiving print data over the network 6, the image forming device 2 is enabled to produce a printed output based on the print data. Multiple local networks 6a and 6b such as LAN (Local Area Network) are connected to each other over an external network 6c such as an internet to form the network 6 of one or more embodiments. The local network 6a, for instance, is installed at a first base, and the local network 6b is installed at a second base which is different from the first base. The network 6 does not always have to be the network formed by connecting the multiple local networks 6a and 6b to each other. The network 6 may be formed by a single local network.

As illustrated in FIG. 1, for example, six image forming devices 2a to 2f are connected to the local network 6a, and three image forming devices 2g to 2i are connected to the local network 6b. Each of the multiple image forming devices 2a to 2i is classified in advance into one of multiple groups G1, G2 and G3. There are two groups G1 and G2 for the local network 6a, and the single group G3 for the local network 6b, for example. Three image forming devices 2a, 2b and 2c are classified into the group G1. Three image forming devices 2d, 2e and 2f are classified into the group G2. Moreover, three image forming devices 2g, 2h and 2i are classified into the group G3. The number of the image forming devices 2 classified into the single group can be any number. The multiple groups G1, G2 and G3 correspond to the respective sections, for example. More specifically, the image forming device 2 classified in each group G1, G2 and G3 is managed by each section. The image forming device 2 in each group G1, G2 and G3 may have a different version of a software for check for viruses from the other groups.

The multiple image forming devices 2 in each group G1, G2 and G3 include at least one storage device 3 and a client device 4. In the example of FIG. 1, one of the image forming devices 2 serves as the storage device 3 and the remaining two image forming devices 2 serves as the client device 4 in each group G1, G2 and G3.

The storage device 3 is to store various types of data such as the print data received from an information processing terminal 5 such as a personal computer (PC) operated by a user, for example. Once receiving the data from the information processing terminal 5, the storage device 3 temporarily stores the data inside. The storage device 3 sends the data stored inside to another client device 4 in response to a request from another client device 4. The storage device 3 is enabled to receive a request from the image forming device 2 in the different group.

The client device 4 accesses the storage device 3, and obtains the data from the storage device 3. The client device 4, for example, obtains print data from the storage device 3, and is enabled to produce a printed output based on the obtained print data.

Figure 2:
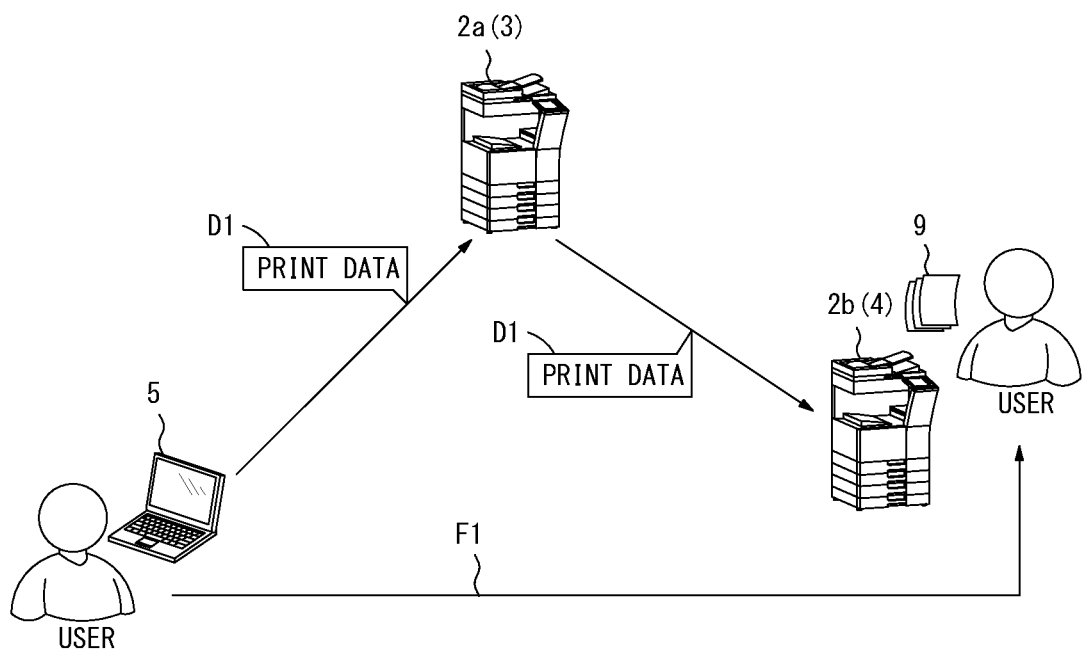
FIG. 2 illustrates an exemplary printing manner at the image forming system according to one or more embodiments.

FIG. 2 illustrates an exemplary printing manner in which one or more embodiments may be practiced. FIG. 2 illustrates an example of printing when a user produces a printed output with the client device 4. After the user inputs an instruction to print data such as a document file to the information processing terminal 5, the information processing terminal 5 generates print data D1, and sends the generated print data to the storage device 3 which is designated in advance. The storage device 3 managed by the section where the user belongs is registered in advance with a printer driver of the information processing terminal 5, for example, as a destination of the print data D1. The information processing terminal 5, therefore, sends the print data D1 to the storage device 3 in the group corresponding to the section where the user belongs.

The user operates the information processing terminal 5 to send the print data D1 to the storage device 3. The user then moves to an installation site of the image forming device 2 by which the user would like the printed output to be produced as shown by an arrow F1. In the example of FIG. 2, the user is moving to the installation site of the image forming device 2b, which is the client device 4. The user logs into the image forming device 2b by operating the image forming device 2b. After the user logs in, the image forming device 2b accesses the storage device 3 to obtain a list of the print data D1 based on which the user is allowed to produce a printed output. The image forming device 2b then displays the obtained list. When an instruction to produce a printed output based on the print data D1 in the list is input by the user, the image forming device 2b sends a request for transmission of the print data D1 to the storage device 3, and obtains the print data D1, which is a target of printing, from the storage device 3. The image forming device 2b starts printing based on the print data D1 obtained from the storage device 3 to produce a printed output 9. Hence, the user is enabled to obtain the printed output 9 from the image forming device 2b which was operated by him or her.

The user may log into the image forming device 2 which is managed by another section besides the image forming device 2 managed by his or her section. Even in such a case, the printed output may be produced as described above. The storage device 3 in the group to which the device logged in by the user belongs does not store therein the print data D1 based on which the user is enabled to produce the printed output. The storage device 3, therefore, identifies the user's section at log-in of the user, and communicates with the storage device 3 in the group corresponding to the user's section. The storage device 3 then obtains the list of the print data D1 based on which the user is allowed to produce the printed output, and obtains the print data D1 specified by the user when the user specifies the print data D1 as the target of printing. The storage device 3 sends the list of the print data D1 or the print data D1 to the image forming device 2 logged in by the user in the same group.

The image forming system 1 is constructed as a pull print system which enables the client device 4 operated by the user to access the storage device 3 and obtain the print data D1 to produce the printed output. When the user logs into the storage device 3, the storage device 3 is enabled to produce the printed output based on the print data D1. Hence, according to one or more embodiments, the user is enabled to make the printed output produced with any of the multiple image forming devices 2a to 2i.

Each of the multiple image forming devices 2 in the above-described image forming system 1 has a virus check function to carry out checks on data received over the network 6 for viruses. The image forming device 2 is described in detailed below.

Figure 3:
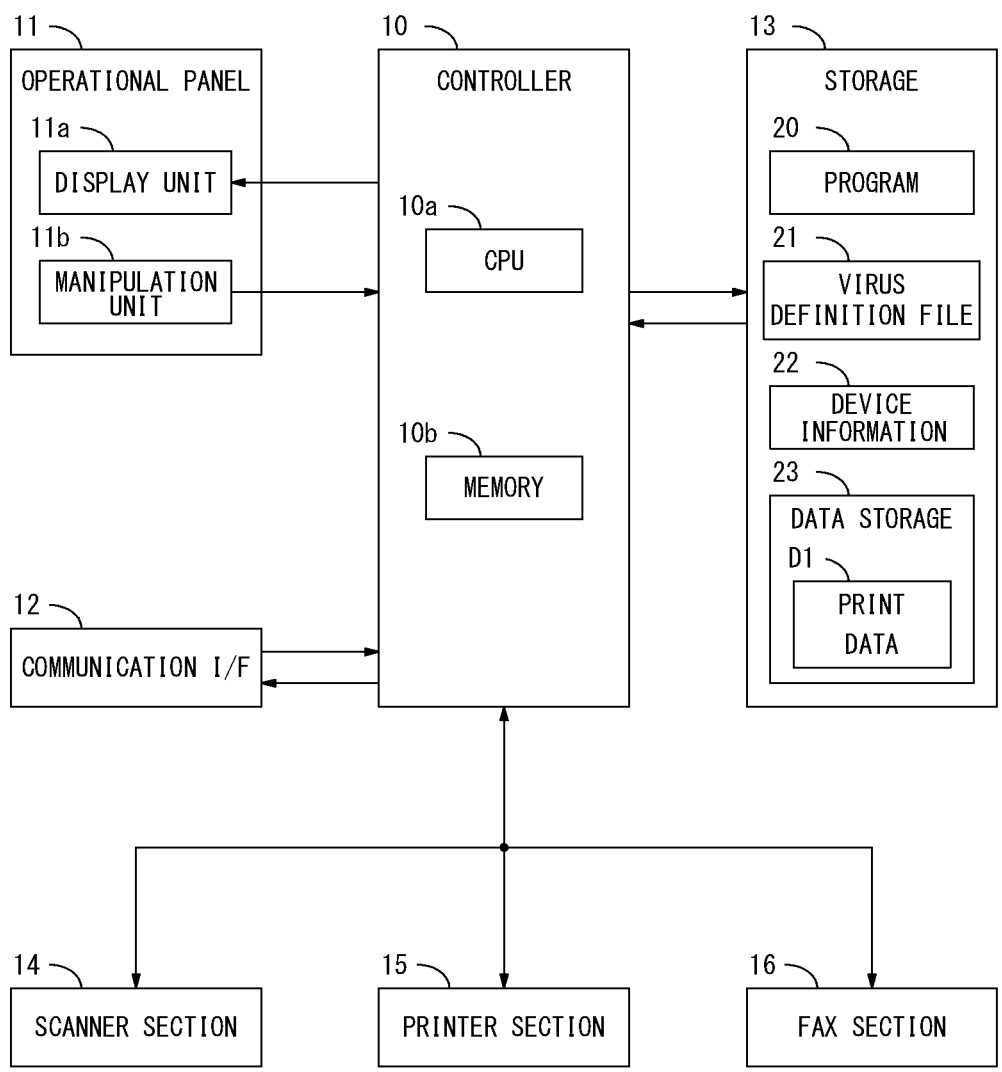
FIG. 3 illustrates a block diagram showing an example of a hardware structure of an image forming device according to one or more embodiments.

FIG. 3 illustrates a block diagram showing an example of a hardware structure of the image forming device 2 according to one or more embodiments. The image forming device 2 includes a controller 10, an operational panel 11, a communication interface 12, a storage 13, a scanner section 14, a printer section 15 and a fax section 16. The storage device 3 and the client device 4 have the same hard structures.

The controller 10 including a CPU 10a and a memory 10b controls operations of each part. The CPU 10a reads and executes a program 20 stored in the storage 13 to enable the controller 10 to serve as a variety of processing parts described later. Data, for instance, used when the CPU 10a processes processing based on the program 20 is temporarily stored in the memory 10b.

The operational panel 11 serves as a user interface for the user to use the image forming device 2. The operational panel 11 includes a display unit 11a that displays a variety of screens operable for the user and a manipulation unit 11b that receives user inputs. The display unit 11a is constructed by a device such as a color liquid crystal display, for instance. The manipulation unit 11b constructed by touch panel keys, for instance, arranged on a display area of the display unit 11a and/or push button keys arranged around the display area of the display unit 11a.

The communication interface 12 is for the image forming device 2 to communicate with the other devices over the network 6. After receiving the data addressed to its device over the network 6, the communication interface 12 outputs the received data to the controller 10. When inputting the data addressed to another device from the controller 10, the communication interface 12 outputs the data to the network 6.

The storage device 13 is formed from a non-volatility storage device such as a hard disk drive (HDD) or a solid state drive (SSD), for example. The program 20 executed by the CPU 10a of the controller 10 is installed in advance in the storage device 3. A software for performing a check for viruses is incorporated in the program 20. The program for the storage device and the program for the client device is separately provided. The program 20 for the storage device is installed in the storage device 3, and the program 20 for the client device is installed in the client device 4.

A virus definition file 21 is also stored in advance in the storage 13. The virus definition file 21 is to be referred when a check for viruses performed at the controller 10. The viruses to be detected are defined by the virus definition file 21. The virus definition file 21 is updated to the latest file on a periodical or non-periodical basis. Each image forming device 2, for example, may update the virus definition file 21 on a periodical basis. An administrator of each group may update the virus definition file 21 to the latest file by manual.

Figure 4:
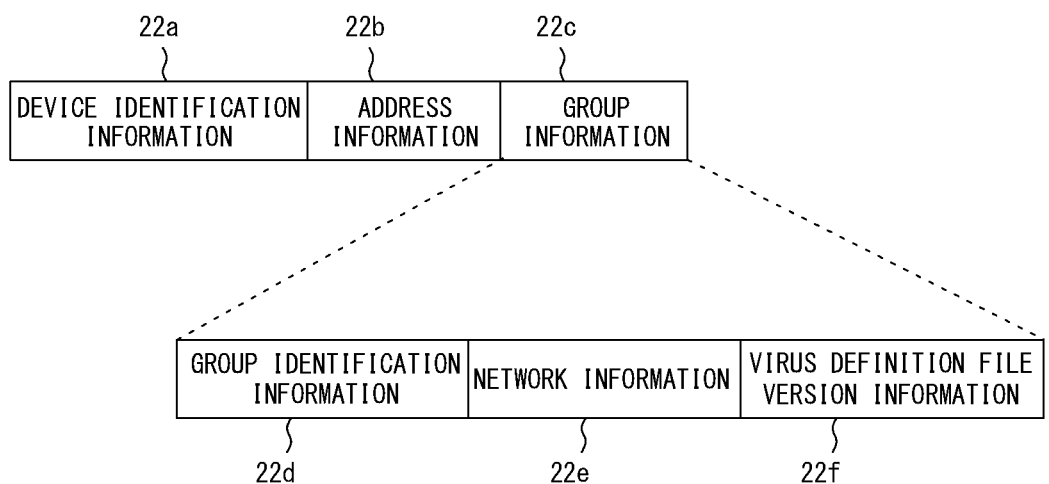
FIG. 4 illustrates an example of device information according to one or more embodiments.

Device information 22 is stored in advance in the storage 13. The device information 22 may identify the image forming device 2. FIG. 4 illustrates an example of the device information 22 according to one or more embodiments. The device information 22 includes device identification information 22a for identifying the image forming device 2, address information 22b of the image forming device 2 and group information 22c indicating the group to which the image forming device 2 belongs. The group information 22c includes group identification information 22d for identifying the group to which the image forming device 2 belongs, network information 22e indicating a network address of the group and virus definition file version information (hereafter, simply "version information") 22f indicating a version of the virus definition file 21. The version information 22f is rewritten to the version corresponding to the latest file every time the virus definition file 21 of the image forming device 2 is updated to the latest file.

The storage 13 includes a data storage 23. The data storage 23 is a storage area in which a variety of data is stored. When receiving the print data D1 over the network 6, for example, the image forming device 2 may store the received print data D1 in the data storage 23. Data besides the data received over the network 6 may also be stored in the data storage 23. Image data generated at the scanner section 14, for instance, may also be stored in the data storage 23.

The scanner section 14 optically reads an image of a document and generates image data. The printer section 15 forms images on a sheet shaped printing material such as a printing sheet based on print data and produces a printed output. The fax section 16 transmits and receives fax data over public phone lines not shown in figures. The image forming device 2 of one or more embodiments is provided with the scanner section 14, the printer section 15 and the fax section 16. However, this is given not for limitation. The image forming device 2 may be a device with at least the printer section 15.

Figure 5:
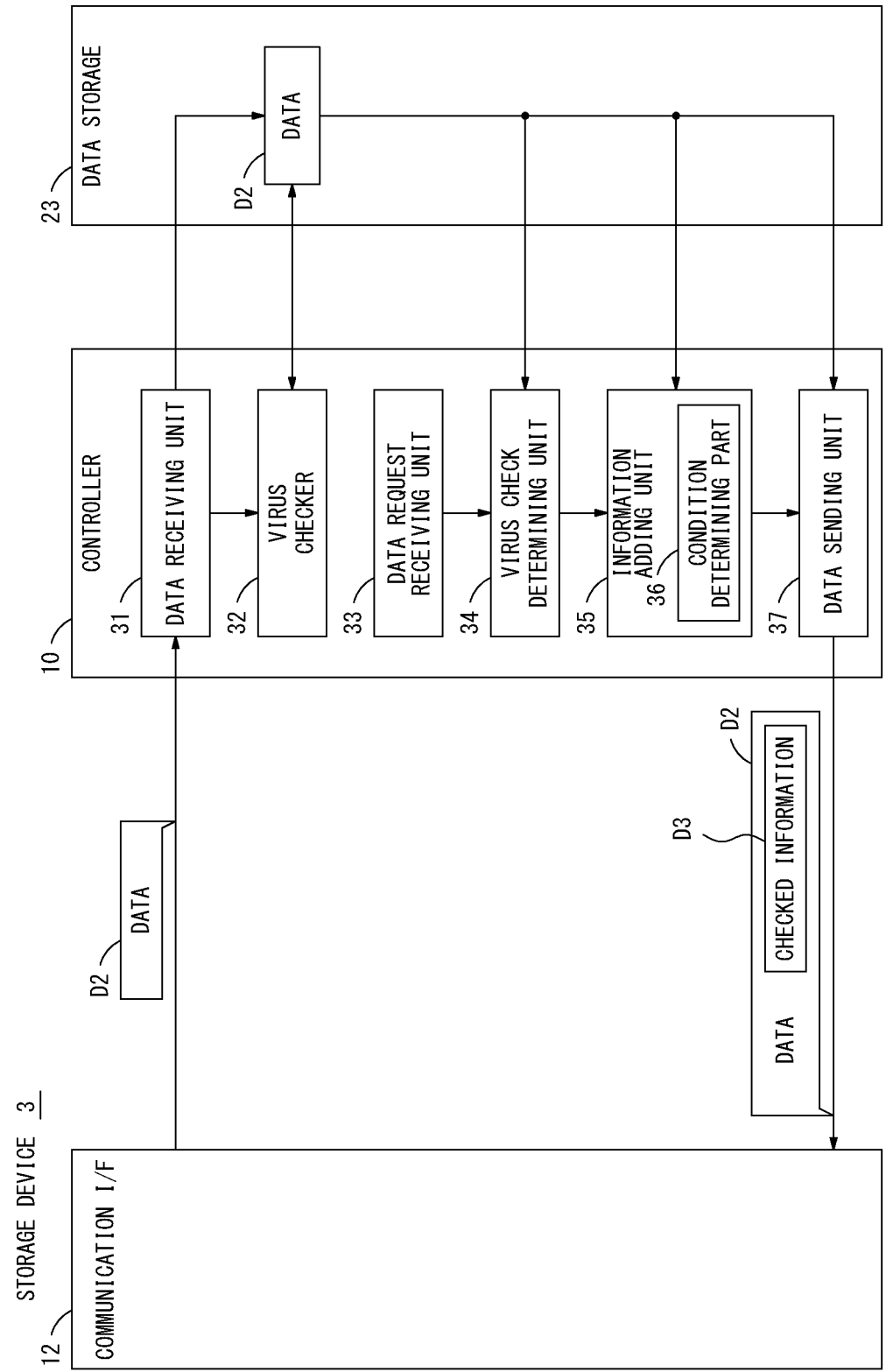
FIG. 5 illustrates an example of a functional structure of the image forming device that serves as a storage device according to one or more embodiments.

A functional structure of the image forming device 2 having the above-described hardware structure is explained next. FIG. 5 illustrates an example of the functional structure of the image forming device 2 that serves as the storage device 3 according to one or more embodiments. As illustrated in FIG. 5, the CPU 10a of the controller 10 executes the program 20 for the storage device so that the image forming device 2 that serves as the storage device 3 serves as a data receiving unit 31, a virus checker 32, a data request receiving unit 33, a virus check determining unit 34, an information adding unit 35 and a data sending unit 37.

The data receiving unit 31 receives data D2 addressed to its device via the communication interface 12. The data receiving unit 31 receives the variety of data D2 via the communication interface 12. The data receiving unit 31 may receive the print data D1 from the information processing terminal 5 as the data D2 addressed to its device. Besides that, the data receiving unit 31 may receive data such as program data to update the program 20 to the latest program, for instance, as the data D2. After obtaining the data D2 received by the communication interface 12, the data receiving unit 31 stores the obtained data D2 in the data storage 23 in the storage 13. The data receiving unit 31 then brings the virus checker 32 into operation.

When the data D2 is received by the data receiving unit 31, the virus checker 32 carries out a check on the data D2 for viruses. The virus checker 32, for example, reads the data D2 stored in the data storage 23 by the data receiving unit 31 and checks the read data D2 for viruses. The virus checker 32 reads the virus definition file 21 in the storage 13, and carries out the check for viruses based on the virus definition file 21. More specifically, the virus checker 32 checks if any of the viruses defined by the virus definition file 21 is in the received data D2.

Once it is confirmed that there is no virus in the received data D2 as a result of the check for viruses, the virus checker 32 maintains a normal storing state of the received data D2. In one or more embodiments, the virus checker 32 adds information stating completion of the check on the data D2 for viruses to virus check history information, which is not shown in figures.

As the result of the check for viruses, the virus checker 32 may detect the virus in the received data D2. In such a case, the virus checker 32 restricts use of the received data D2. The virus checker 32, for example, may delete the data D2 which contains the virus from the data storage 23.

When receiving the data D2 over the network 6, the storage device 3 is configured to carry out the check on the received data D2 for viruses in real time.

The data request receiving unit 33 receives a request from the client device 4. Once the user logs into the client device 4 by operating it, for example, the data request receiving unit 33 receives the request from the client device 4. The request is to request for the list which allows the logged-in user to produce printed outputs. The data request receiving unit 33 then analyzes whole data D2 stored in the data storage 23, and creates a list of the print data D1 based on which the logged-in user may produce printed outputs. The data request receiving unit 33 does not include the print data D1 in which virus is detected in the list so that the data containing virus is not forwarded to the client device 4. The list of the print data D1 based on which the logged-in user may produce printed outputs is then displayed on a display area of the client device 4.

After sending the list of the print data D1, the data request receiving unit 33 receives a data request specifying the print data D1 from the client device 4. After receiving the data request, the data request receiving unit 33 identifies the data D2 to send to the client device 4. The data request receiving unit 33 then brings the virus check determining unit 34 into operation.

The virus check determining unit 34 determines if the check on the data D2 to send to the client device 4 for viruses has already been carried out. The virus check determining unit 34, for example, refers to the virus check history information so that it determines whether or not the check on the data D2 to send for viruses has already been carried out. As a result of the determination, the check on the data D2 for viruses may have already been carried out. In this case, the virus check determining unit 34 brings the information adding unit 35 into operation.

When the virus check determining unit 34 determines that the check on the data D2 to send for viruses has already been carried out, the information adding unit 35 adds checked information D3 to the data D2 to send to the client device 4. The information adding unit 35 may, for example, write the checked information D3 in a header of the data D2 or add the checked information D3 as another data different from the data D2.

When the check on the data D2 to send for viruses has already been carried out, the information adding unit 35 may add the checked information D3 to the data D2 unconditionally. However, this is given not for limitation. Even when it is determined that the check on the data D2 to send for viruses has already been carried out, the information adding unit 35 may further determine if a predetermined condition is met, and may add the checked information D3 only if the predetermined condition is met. A case where the condition is determined by the information adding unit 35 is explained below.

The information adding unit 35 includes a condition determining part 36 that determines whether or not to add the checked information D3. When it is determined that the check on for viruses has already been carried out by the virus check determining unit 34, the information adding unit 35 brings the condition determining part 36 into operation. A condition set in advance by the user such as the administrator is registered with the condition determining part 36. The condition determining part 36 determines if such condition set in advance is met.

There are many kinds of conditions determined by the condition determining part 36. The condition determining part 36, for example, obtains the device information 22 from the client device 4 to which the data D2 is to be sent. The condition determining part 36 determines a condition corresponding to the client device 4 based on the device information 22 obtained from the client device 4. The condition determining part 36 is also enabled to analyze the data D2, which is the target of the transmission, and determine a condition corresponding to the data D2.

Some examples of determinations based on the device information 22 is explained first. After obtaining the device information 22, the condition determining part 36 identifies the version of the virus definition file 21 of the client device 4 based on the version information 22f in the device information 22. The condition determining part 36 reads the device information 22 of its device in the storage 13, and identifies the version of the virus definition information 21 of the device. The condition determining part 36 then compares the version of the client device 4 and the version of its device. The version of the client device 4 and the version of its device may be equal, or the version of its device may be newer than the version of the client device 4. In this case, the condition determining part 36 determines that the condition to add the checked information D3 is met. If the version of its device is older than the version of the client device 4, the condition determining part 36 determines that the condition to add the checked information D3 is not met.

The condition determining part 36 may determine the condition based on the group identification information 22d in the device information 22 instead of the version information 22f. More specifically, when the condition determining part 36 obtains the device information 22, it identifies the group to which the client device 4 belongs based on the group identification information 22d in the device information 22. The condition determining part 36 reads the device information 22 of its device in the storage 13, and identifies its group. The group to which the client device 4 belongs and the group to which its device belongs may be the same. In such a case, the condition determining part 36 determines that the condition to add the checked information D3 is met. To be more specific, if the client device 4 belongs to the group the same as its device, it means the version of the virus definition file 21 of the client device 4 is the same as that of its device. The condition determining part 36 then determines that the condition is met. On the other hand, if the client device 4 belongs to the group different from its device, the condition determining part 36 determines that the condition to add the checked information D3 is not met. When they belong to the different groups, there is a possibility that the version of the virus definition file 21 of the client device 4 is newer than that of its device. Hence, the condition determining part 36 determines that the condition is not met.

As a result of determination of the group to which the client device 4 belongs as described above, the condition determining part 36 may determine that the client device 4 belongs to the different group from its device. In this case, the condition determining part 36 may further carry out a determination based on the network information 22e. As described above, the network information 22e indicates the network address of the group. The condition determining part 36 identifies the network address of the group to which the client device 4 belongs based on the network information 22e and the network address of the group to which its device belongs based on the network information 22e of its device. The condition determining part 36 determines whether or not the network to which its device is connected and the network to which the client device 4 is connected are the same network based on the identified network addresses. The network to which its device is connected and the network to which the client device 4 is connected may be different. In such a case, its device and the client device 4 are installed in the different places, so there is a possibility that the version of the virus definition file 21 of its device and that of the client device 4 is different from each other. When its device and the client device 4 are connected to the different networks, the condition determining part 36 determines that the condition to add the checked information D3 is not met. When its device and the client device 4 are connected to the same network, the condition determining part 36 may determine that the condition to add the checked information D3 is met.

Moreover, as a result of determination of the group to which the client device 4 belongs as described above, the condition determining part 36 may determine that the client device 4 belongs to the different group from its device. In this case, the condition determining part 36 may further carry out a determination based on the version information 22f instead of the determination based on the network information 22e or in addition to the determination based on the network information 22e. To be more specific, the condition determining part 36 identifies the version of the virus definition file 21 of the group to which the client device 4 belongs based on the version information 22f and the version of the virus definition file 21 of the group to which its device belongs based on the device information 22 of its device. The condition determining part 36 compares the version of the virus definition file 21 of the group to which the client device 4 belongs and the version of the virus definition file 21 of the group to which its device belongs. The version of the virus definition file 21 of the group to which the client device 4 belongs and the version of the virus definition file 21 of the group to which its device belongs may be equal, or the version of the virus definition file 21 of the group to which its device belongs may be newer than the version of the virus definition file 21 of the group to which the client device 4 belongs. In this case, the condition determining part 36 determines that the condition to add the checked information D3 is met. This determination enables not to add the checked information D3 only when the version of the virus definition file 21 of the group to which the client device 4 belongs is newer than the version of the virus definition file 21 of the group to which its device belongs.

An example of a determination based on the data D2 to send is explained next. The condition determining part 36 analyzes the data D2 to send, and determines that the data D2 is what kind of data. When the data D2 is the print data D1, the condition determining part 36 determines that the condition to add the checked information D3 is met. When the data D2 is the data other than the print data D1, the condition determining part 36 determines that the condition to add the checked information D3 is not met. The data D2 may be, for instance, the program data executed at the client device 4. In such a case, the condition determining part 36 determines that the condition to add the checked information D3 is not met. There may be a virus in the program data. If the program data is executed at the client device 4, the client device 4 is infected with a virus. In order to prevent the virus infection, the condition determining part 36 enables the client device 4 to carry out the check again on the program data for viruses. Hence, the condition determining part 36 determines not to add the checked information D3. This determination based on the data D2 may be carried out instead of the above-described determination based on the device information 22 or in addition to the determination based on the device information 22.

The variety of conditions as described above are set in advance by the administrator with the condition determining part 36. The condition determining part 36 determines whether or not at least one condition set by the administrator is met. If the multiple conditions are set by the administrator, the condition determining part 36 determines whether or not every one of the conditions set by the administrator is met.

When the condition determining part 36 determines the condition to add the checked information D3 is met, the information adding unit 35 adds the checked information D3 to the data D2 to send to the client device 4. When the condition determining part 36 determines the condition to add the checked information D3 is not met, the information adding unit 35 does not add the checked information D3 to the data D2 to send to the client device 4.

The data sending unit 37 sends the data D2 to the client device 4 which is the sender of the data request via the communication interface 12. When the checked information D3 is added to the data D2 by the information adding unit 35, the data sending unit 37 sends the data D2 to which the checked information D3 is added to the client device 4. If the checked information D3 is not added by the information adding unit 35, the data sending unit 37 sends the data D2 in the storage 23 as it is to the client device 4.

The image forming device 2 with the above-described function serves as the storage device 3 is configured to determine whether or not to add the checked information D3 when sending the data D2 to the client device 4. In this determination, whether or not to enable the client device 4 to carry out again the check for viruses is determined. When the check for viruses is required to be carried out again, the data D2 with no checked information D3 added is sent to the client device 4. When the check for viruses is not required to be carried out again, the data D2 with the checked information D3 added is sent to the client device 4. The client device 4, therefore, is enabled to determine whether the check for viruses is required to be carried out again or not at receipt of the data D2 based on the attachment of the checked information D3.

Figure 6:
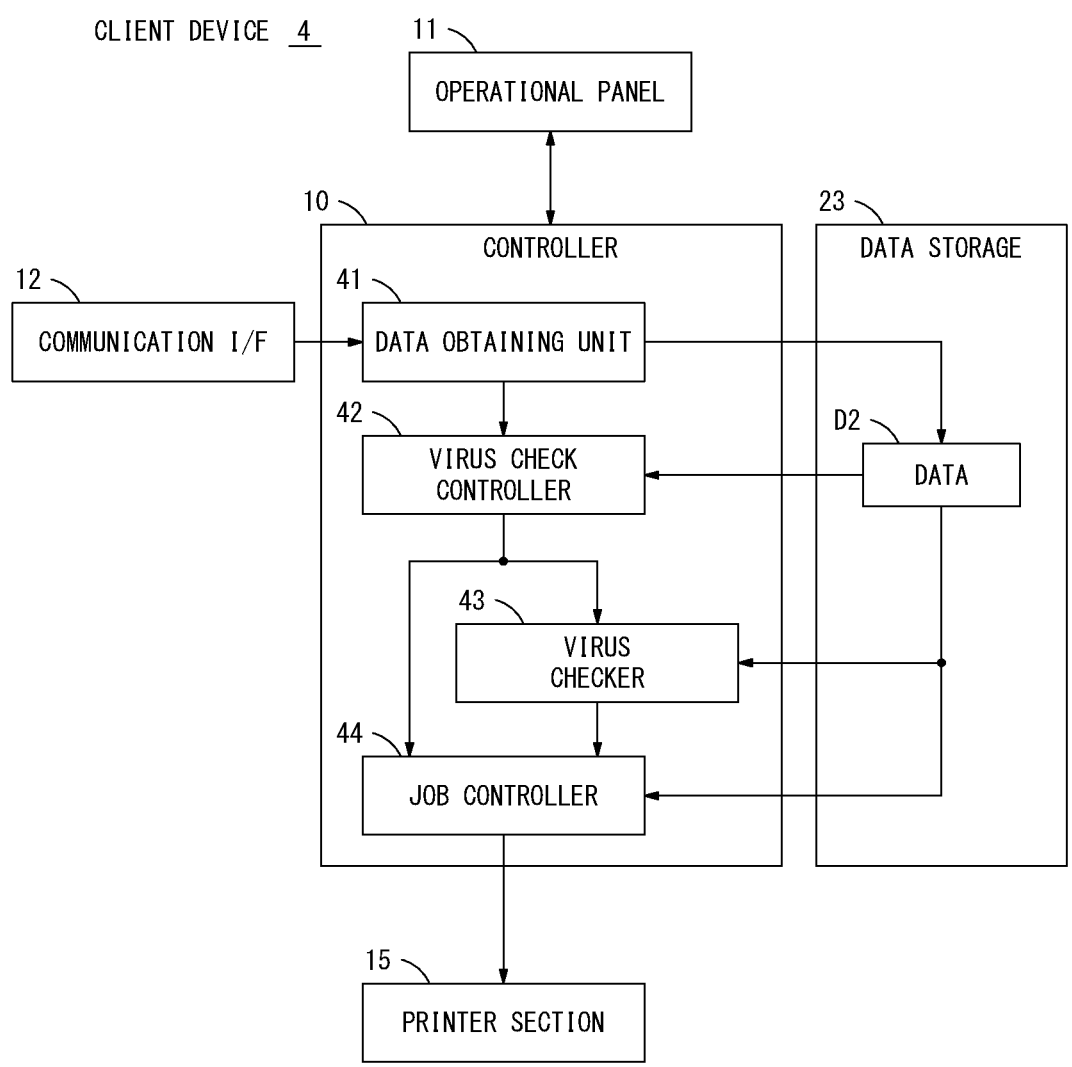
FIG. 6 illustrates an example of a functional structure of the image forming device that serves as a client device according to one or more embodiments.

FIG. 6 illustrates a block diagram showing an example of a functional structure of the image forming device 2 that serves as the client device 4 according to one or more embodiments. As illustrated in FIG. 6, the CPU 10a of the controller 10 executes the program 20 for the client device so that the image forming device 2 serving as the client device 4 serves as a data obtaining unit 41, a virus check controller 42, a virus checker 43 and a job controller 44.

The data obtaining unit 41 accesses the storage device 3, and obtains the data D2 from the storage device 3. When the user logs into the client device 4, for example, the data obtaining unit 41 identifies the logged-in user, and requests the storage device 3 for the list of the print data D1 based on which the logged-in user is allowed to produce the printed output. After obtaining the list from the storage device 3, the data obtaining unit 41 displays the list on the display unit 11a of the operational panel 11. Once the print data D1 to print is selected by the logged-in user from the list, the data obtaining unit 41 sends the data request specifying the print data D1 to the storage device 3. Thus, the data obtaining unit 41 is enabled to obtain the data D2 from the storage device 3. After obtaining the data D2, the data obtaining unit 41 stores the obtained data D2 in the data storage 23. In response to receiving the data D2 from the storage device 3, the data obtaining unit 41 brings the virus check controller 42 into operation.

When the client device 4 obtains the data D2 over the network 6, the virus check controller 42 determines if it is necessary for the client device 4 to carry out the check on the data D2 for viruses, and controls the check for viruses. To be more specific, the virus check controller 42 determines if the checked information D3 is added to the data D2 obtained by the data obtaining unit 41. As a result of the determination, the checked information D3 may be added. In this case, the virus check controller 42 finds out that the data D2 obtained by the data obtaining unit 41 has already been checked for viruses. The virus check controller 42 then decides to skip the check on the obtained data D2 for viruses. In this case, the virus check controller 42 does not bring the virus checker 43 into operation when obtaining the data D2. If the data D2 is the print data D1, the virus check controller 42 brings the job controller 44 into operation next.

When the checked information D3 is not added, the virus check controller 42 finds out that the data D2 obtained by the data obtaining unit 41 has not been checked for viruses yet. The virus check controller 42 then decides to carry out the check on the obtained data D2 for viruses. After deciding to carry out the check for viruses, the virus check controller 42 brings the virus checker 43 into operation.

When the virus check controller 42 decides to carry out the check for viruses, the virus checker 43 reads the data D2 in the data storage 23, and carries out the check on the data D2 for viruses. More specifically, the virus checker 43 starts the check for viruses when the data D2 is obtained by the data obtaining unit 41 over the network 6. The virus checker 43 reads the virus definition file 21 in the storage 13, and carries out the check for viruses based on the read virus definition file 21. More specifically, the virus checker 43 checks if the virus defined by the virus definition file 21 of its device is in the data D2. The time required for the process to check for viruses depends on an amount of data contained in the data D2. More amount of data takes longer time. When the data D2 is the print data D1, the virus checker 43 brings the job controller 44 into operation after completion of the check for viruses only if the virus is not detected in the check for viruses.

As a result of the check for viruses, the virus checker 43 may detect the virus in the data D2. In this case, the virus checker 43 restricts the use of the data D2. The virus checker 43 may, for example, delete the data D2 infected by the virus from the data storage 23.

The job controller 44 controls processing of the job at the image forming device 2. When the data D2 stored in the data storage 23 is the print data D1, the job controller 44 reads the print data D1 and drives the printer section 15. The printer section 15 then starts the process to produce the printed output based on the print data D1.

When the virus check controller 42 decides to carry out the check for viruses, the job controller 44 starts the process to produce the printed output after completion of the check for viruses carried out by the virus checker 43. This requires a predetermined period of time before starting the process to produce the printed output, however, this may prevent the image forming device 2 to produce the printed output based on the virus infected print data D1.

When the virus check controller 42 decides to skip the check for viruses, the job controller 44 is enabled to start the process to produce the printed output soon after the print data D1 is obtained by the data obtaining unit 41. The time until the image forming device 2 starts the process to produce the printed output is then allowed to be shortened, resulting in enhanced convenience. Even in this case, the storage device 3 has already carried out the check for viruses. There, therefore, is less possibility of virus infection and it may prevent degradation in security.

Figure 7:
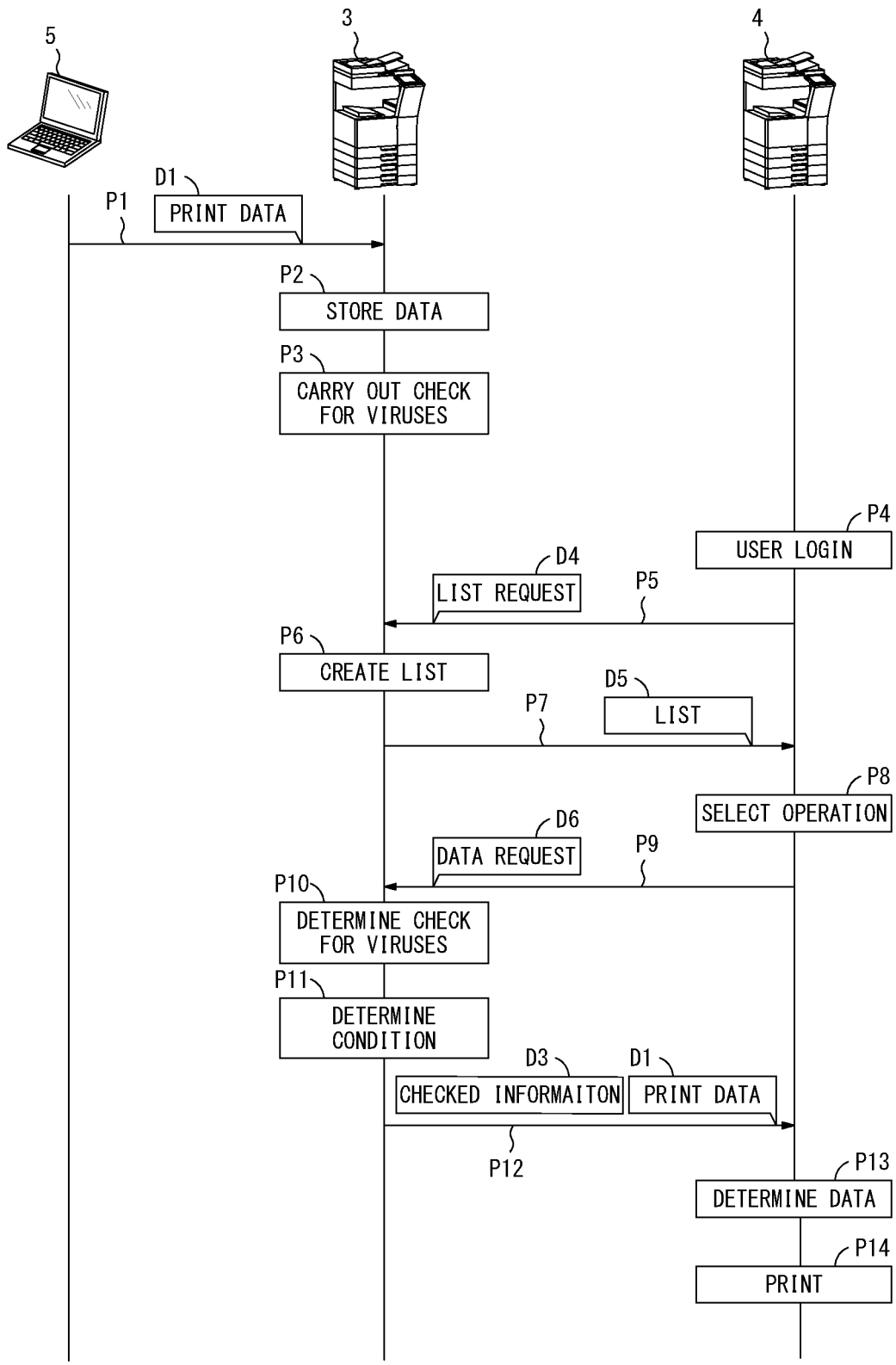
FIG. 7 is a flow diagram showing an exemplary operation performed at the image forming system when a check for viruses carried out by the client device is skipped according to one or more embodiments.

FIG. 7 is a flow diagram showing an exemplary operation performed at the image forming system 1 when the check for viruses carried out by the client device 4 is skipped according to one or more embodiments. The information processing terminal 5 generates the print data D1 and sends the generated print data D1 to the storage device 3 in response to the user operation (process P1). After receiving the print data D1, the storage device 3 stores the received print data D1 in the data storage 23 (process P2). The storage device 3 carries out the check on the print data D1 received from the information processing terminal 5 for viruses (process P3). Once it is confirmed that the print data D1 is not infected with the virus through the check for viruses, the print data D1 is kept being normally stored in the storage device 3.

The user moves to the installation site of the targeted client device 4, and operates the client device 4 to log into the client device 4. The user then logs into the client device 4 (process P4). After shifting to a logged-in state in which the user is being logged in, the client device 4 sends a list request D4 to the storage device 3 (process P5). This list request D4 is a command to request for the list of the print data D1 based on which the logged-in user is allowed to produce the printed output. In response to receiving the list request D4, the storage device 3 creates a list D5 of the print data D1 based on which the logged-in user is allowed to produce the printed output (process P6), and sends the created list D5 to the client device 4 (process P7). After receiving the list D5 from the storage device 3, the client device 4 displays an operation screen that enables the user to select the print data D1 to print based on the list D5 on the operational panel 11. The client device 4 then receives an operation to select the print data D1 from the user (process P8). After the print data D1 is selected, the client device 4 sends a data request D6 specifying the print data D1 to the storage device 3 (process P9).

After receiving the data request D6 from the client device 4, the storage device 3 identifies the print data D1 to send to the client device 4 based on the data request D6. The storage device 3 then carries out the check for viruses (process P10). To be more specific, the storage device 3 determines if the check on the print data D1 to send for viruses has been completed. As a result of the determination, the check for viruses may have already been completed. In such a case, the storage device 3 determines whether or not the condition to add the checked information D3 is met (process P11). When the condition is not set with the storage device 3, the process in process P11 is not performed. When determining that the condition to add the checked information D3 is met, the storage device 3 adds the checked information D3 to the print data D1 to send, and sends the print data D1 with the checked information D3 to the client device 4 (process P12).

After obtaining the print data D1 from the storage device 3, the client device 4 determines the data, and confirms if the checked information D3 is added to the print data D1 (process P13). The checked information D3 may be added. In this case, the client device 4 starts producing the printed output without carrying out the check on the print data D1 obtained from the storage device 3 for viruses (process P14). Hence, the client device 4 is enabled to promptly start producing the printed output after obtaining the print data D1 from the storage device 3.

Figure 8:
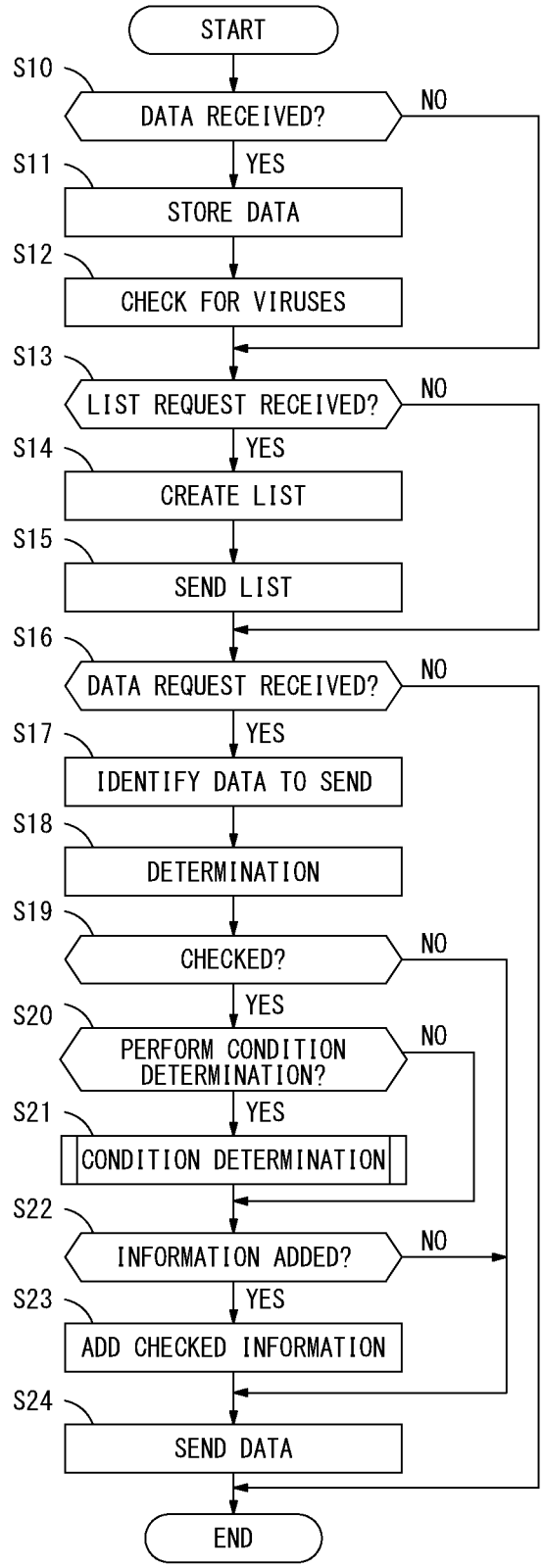
FIG. 8 illustrates a flow diagram explaining an exemplary procedure of a main process performed at the storage device according to one or more embodiments.

A detailed process sequence performed at the image forming device 2 is explained next. FIG. 8 illustrates a flow diagram explaining an exemplary procedure of a process performed at the storage device 3 according to one or more embodiments. This process is performed when the CPU 10a of the storage device 3 executes the program 20 for the storage device, and is repeatedly performed every predetermined period of time, for instance, at the storage device 3.

Upon start of the process based on the program 20, the storage device 3 determines if the data D2 such as the print data D1 is received over the network 6 (step S10). In response to receiving the data D2 (when a result of step S10 is YES), the storage device 3 stores the received data D2 in the data storage 23 (step S11). The storage device 3 carries out the check on the data D2 for viruses (step S12). As a result, whether or not the data D2 is infected with the virus is checked and only the data D2 not infected with the virus becomes the target of the later process. When the data D2 is not received over the network 6 (when a result of step S10 is NO), the process in steps S11 and S12 is skipped.

The storage device 3 determines whether or not the list request D4 is received from the client device 4 (step S13). The list request D4 may be received (when a result of step S13 is YES). In this case, the storage device 3 creates the list D5 of the print data D1 based on which the user logging into the client device 4 is enabled to produce the printed output (step S14), and sends the created list D5 to the client device 4 (step S15). If the list request D4 is not received (when a result of step S13 is NO), the process in steps S14 and S15 is skipped.

The storage device 3 determines if the data request D6 is received from the client device 4 (step S16). The data request D6 may be received (when a result of step S16 is YES). In this case, the storage device 3 identifies the data D2 to send (step S17), and determines if the process to check for viruses has already been completed (step S18). When the check on the data D2 for viruses has not been completed yet (when a result of step S19 is NO), the process by the storage device 3 moves to step S24. The check on the data D2 for viruses may have already been completed (when a result of step S19 is YES). The storage device 3 then determines whether or not to determine another condition (step S20). For determining the condition (when a result of step S20 is YES), the storage device 3 performs a condition determination (step S21). In this condition determination, whether or not the condition to add the checked information D3 which is set in advance by the administrator is met is determined. When not performing the condition determination (when a result of step S20 is NO), the process in step S21 is skipped.

The storage device 3 then determines whether or not to add the checked information D3 to the data D2 to send to the client device 4 (step S22). When the condition determination (step S21) is performed, the storage device 3 determines whether or not to add the checked information D3 based on the determination result. If the condition determination (step S21) is not performed, it means that the check on the data D2 for viruses has already been carried out. The storage device 3, therefore, determines to add the checked information D3.

When determining to add the checked information D3 (when a result of step S22 is YES), the storage device 3 adds the checked information D3 to the data D2 to send (step S23). When determining not to add the checked information D3 (when a result of step S22 is NO), the storage device 3 skips the process in step S23, and does not add the checked information D3 to the data D2. The storage device 3 then sends the data D2 to the client device 4 (step S24). If the checked information D3 is added to the data D2, the storage device 3 sends the data D2 together with the checked information D3 to the client device 4.

FIG. 9 illustrates a flow diagram explaining an exemplary procedure of the condition determination (step S21) in detail, according to one or more embodiments. Upon start of the condition determination (step S21), the storage device 3 analyzes the data D2 to send (step S30), and determines if the data D2 is the print data D1 (step S31). When the data D2 to send is the print data D1 (when a result of step S31 is YES), the storage device 3 requests the client device 4 for the device information 22 (step S32), and obtains the device information 22 from the client device 4 (step S33). The storage device 2 analyzes the device information 22 obtained from the client device 4 (step S34) to determine if addition of the checked information D3 is necessary (step S35). In this step S35, whether or not to add the checked information D3 is determined based on the condition set in advance by the user such as the administrator. The storage device 3, for example, compares the information in the device information 22 of its device and the information in the device information 22 obtained from the client device 4 so that determining whether or not to add the checked information D3.

In response to determining that the checked information D3 is required to be added (when a result of step S35 is YES), the storage device 3 decides to add the checked information D3 to the data D2 to send (step S36). The storage device 3 may determine that the addition of the checked information D3 is not necessary (when a result of step S35 is NO). In this case, the storage device 3 decides not to add the checked information D3 to the data D2 to send (step S37). Thus, the condition determination (step S21) ends.

FIG. 10 illustrates a flow diagram explaining an exemplary procedure of a process performed at the client device 4 according to one or more embodiments. This process is performed when the CPU 10a of the client device 4 executes the program 20 for the client device, and is repeatedly performed every predetermined period of time, for instance, at the client device 4.

Upon start of the process, the client device 4 determines whether or not to shift to the logged-in state in which the user is logging in (step S40). If not shifting to the logged-in state (when a result of step S40 is NO), the process ends. If shifting to the logged-in state (when a result of step S40 is YES), the client device 4 performs a login process (step S41). Through the login process, the client device 4 shifts to the logged-in state in which the user is logging in.

After shifting to the logged-in state, the client device 4 sends the list request D4 to the storage device 3 (step S42). The client device 4 then obtains the list D5 from the storage device 3 (step S43), and displays the obtained list D5 on the display unit 11a of the operational panel 11 (step S44).

After detecting that the data D2 is selected by the logged-in user (when a result of step S45 is YES), the client device 4 sends the data request D6 requesting for the data D2 specified by the logged-in user to the storage device 3 (step S46). After sending the data request D6, the client device 4 determines if the request for the device information 22 is received from the storage device 3 (step S47). When receiving the request for the device information 22 (when a result of step S47 is YES), the client device 4 reads the device information 22 in the storage 13 and sends to the storage device 3 (step S48). If not receiving the request for the device information 22 (when a result of step S47 is NO), the process in step S48 is skipped.

The client device 4 then enters a waiting state for receipt of the data D2 from the storage device 3 (step S49). In response to receiving the data D2 (when a result of step S49 is YES), the client device 4 determines if the checked information D3 is added to the data D2 (step S50). When the checked information D3 is not added, the client device 4 brings the virus checker 43 into operation to enable the virus checker 43 to carry out the check on the data D2 received from the storage device 3 for viruses (step S51). When the checked information D3 is added, the client device 4 skips the check on the received data D2 for viruses.

The client device 4 determines if the received data D2 is the print data D1 (step S52). As a result, the data D2 may be the print data D1 (when a result of step S52 is YES). In this case, the client device 4 starts producing the printed output based on the print data D1 (step S53). When the data D2 is the data other than the print data D1 (when a result of step S52 is NO), the client device 4 processes the data based on the received data D2 (step S54). It is assumed, for example, the data D2 is program data to update the program 20 for the client device to a latest program. In this case, the client device 4 executes the program data so that it is enabled to update the program 20 in the storage 13. As described above, the process at the client device 4 ends.

As described above, the storage device 3 of one or more embodiments is constructed to provide the client device 4 with the data D2 to process. The storage device 3 includes the virus checker 32 and the virus check determining unit 34. In response to receiving the data D2 over the network 6, the virus checker 32 carries out the check on the received data D2 for viruses. When the data D2 is sent to the client device 4, which is the external device, the virus check determining unit 34 determines whether or not the data D2 is checked for viruses. When the virus check determining unit 34 determines that the data D2 has already been checked for viruses, the checked information D3 is added to the data D2 to send to the client device 4. If the checked information D3 is added to the data D2 when receiving the data D2 from the storage device 3, the client device 4 with this structure is enabled to start promptly the process on the data D2 without carrying out the check for viruses at its device. Especially, when the data D2 obtained from the storage device 3 is the print data D1, the client device 4 is enabled to promptly start producing the printed output based on the print data D1. This can shorten the time until starting production of the printed output.

When the checked information D3 is not added to the data D2 obtained from the storage device 3, the client device 4 carries out a check on the data D2 for viruses at its device after obtaining the data D2. This may decrease possibility of infection with viruses.

Especially, when the virus check determining unit 34 determines that the check for viruses has already been carried out, the storage device 3 further determines if the predetermined condition is met. When determining that the predetermined condition is met, the storage device 3 adds the checked information D3 to the data D2 to send to the client device 4. On the other hand, the storage device 3 may determine that the predetermined condition is not met. The storage device 3 then does not add the checked information D3 to the data D2 to send. To be more specific, even when the check on the data D2 for viruses has already been carried out by the storage device 3, the storage device 3 does not add the checked information D3 to the data D2 if it is appropriate to enable the client device 4 to carry out again the check for viruses. As a result, this may enable the client device 4 to perform again the check for viruses at its device.

The storage device 3 and the client device 4 may belong to the different groups or may be installed on the different networks 6. In such a case, the administrators of the storage device 3 and the client device 4 may also differ. The version of the virus definition file 21 of the storage device 3 and that of the client device 4 may also be different. In other words, there is a possibility that the version of the client device 4 is newer than the version of the storage device 3. The storage device 3 enables the client device 4 to carry out again the check for viruses so that the data may be checked for viruses using the latest version of the virus definition file 21. The check for viruses using the latest version of the virus definition file 21 enables the client device 4 to detect the virus not detected by the storage device 3.

If the data D2 is the print data D1, the client device 4 only produces the printed output based on the data D2. In this case, there is a low risk of infection with viruses comparing to the case where the data D2 is another data such as the program data. If, therefore, the data D2 is the print data D1, the storage device 3 may add the checked information D3 without determining the other conditions.

As described above, the check for viruses at the image forming device can be skipped if the similar check for viruses has already been carried out at the information processing device when the image forming device obtains the data from the information processing device. Therefore, the check for viruses at the image forming device may be omitted, and the time until starting the production of the printed output may be shortened without reduction of the security.

Although the embodiments of the present invention have been described and illustrated in detail, it is clearly understood that the same is by way of illustration and example only and not limitation, the scope of the present invention should be interpreted by terms of the appended claims.

Modifications

While embodiments of the present invention have been described above, the present invention is not limited to the previously-described embodiments. Various modifications may be applied to embodiments of the present invention.

In one or more embodiments, for example, the storage device 3 is formed from the image forming device 2. More specifically, the above-described storage device 3 includes a processing part such as the printer section 15 as well as the client device 4. The storage device 3, however, does not have to be the device formed from the image forming device 2. To be more specific, the storage device 3 may be formed from an information processing device such as a general personal computer (PC) or a server. In this case, the information processing device does not include the scanner section 14, the printer section 15 and the fax section 16 as its hardware structure illustrated in FIG. 3, for example.

In one or more embodiments, the image forming device 2 is constructed by a device such as the MFP including multiple functions such as the scan function, the print function, the copy function and the fax function. The image forming device 2 does not have to include the multiple functions such as the scan function, the print function, the copy function and the fax function. The image forming device 2, for example, may be a printer only including the print function.

In one or more embodiments, the storage device 3 obtains the data D2 from the information processing terminal 5. However, this is given not for limitation. More specifically, the storage device 3 may receive the data D2 from a server installed on a cloud such as the internet and store.

The program 20 of one or more embodiments executed by the CPU 10a is installed in advance in the image forming device 2. The program 20 does not always have to be installed in advance in the image forming device 2. The program 20 may be the target of trading. The program 20 then may be provided with the image forming device 2 over an internet in a manner that enables the user to download, or may be provided with the image forming device 2 in a manner that is recorded on a computer readable recording medium such as a CD-ROM or a USB memory.

What is claimed is:

1. An information processing device that communicates with an image forming device, the information processing device comprising:
   a storage that stores data; and
   a hardware processor that:
      receives the data and stores the data in the storage;
      checks the data for viruses when the data is received; and
      sends the data stored in the storage to the image forming device, wherein
   the hardware processor determines whether the data has been checked for viruses before the data is sent to the image forming device, and
   the hardware processor adds, upon determining that the data has been checked for viruses, checked information to the data before the data is sent to the image forming device.

2. The information processing device according to claim 1, wherein the hardware processor further:
   determines, upon determining that the data has been checked for viruses, whether a predetermined condition is met, wherein
   upon determining that the predetermined condition is met, the hardware processor adds the checked information to the data to be sent.

3. The information processing device according to claim 2, wherein
   upon determining that the predetermined condition is not met, the hardware processor does not add the checked information to the data to be sent.

4. The information processing device according to claim 2, wherein the hardware processor further:
   obtains device information relating to the image forming device; and
   determines, upon determining that the data has been checked for viruses, whether the predetermined condition is met based on the device information.

5. The information processing device according to claim 4, wherein
   the device information includes version information of a virus definition file of the image forming device,
   the hardware processor identifies a version of the virus definition file of the image forming device based on the version information, and
   when a version of a virus definition file of the information processing device is equal to or newer than the version of the virus definition file of the image forming device, the hardware processor adds the checked information to the data to be sent.

6. The information processing device according to claim 4, wherein
   the device information includes group information relating to a group to which the image forming device belongs, the hardware processor identifies the group to which the image forming device belongs based on the group information, and
   upon determining that the image forming device and the information processing device belong to the same group, the hardware processor adds the checked information to the data to be sent.

7. The information processing device according to claim 6, wherein
   the device information includes version information of the virus definition file of the image forming device, and
   when the hardware processor determines that the group to which the image forming device belongs is different from a group to which the information processing device belongs, the hardware processor further identifies a version of the virus definition file of the group to which the image forming device belongs based on the version information, and
   when a version of the virus definition file of the group to which the information processing device belongs is equal to or newer than the version of the virus definition file of the group to which the image forming device belongs, the hardware processor adds the checked information to the data to be sent.

8. The information processing device according to claim 6, wherein
the group information includes network information, and
when the hardware processor determines that the group to which the image forming device belongs is different from a group to which the information processing device belongs, the hardware processor further identifies a network to which the image forming device is connected based on the network information, and
when a network to which the information processing device is connected and the network to which the image forming device is connected are different, the hardware processor does not add the checked information to the data to be sent.

9. The information processing device according to claim 2, wherein the hardware processor further:
analyzes, upon determining that the data has been checked for viruses, the data to be sent to the image forming device, and
determines whether the predetermined condition is met based on a result of the analysis.

10. The information processing device according to claim 9, wherein
when the data sent to the image forming device is program data executed by the image forming device, the hardware processor does not add the checked information to the data to be sent.

11. An image forming device that communicates with an information processing device, the image forming device comprising:
a hardware processor that:
receives data from a storage of the information processing device;
produces a printed output based on the received data; and
determines, after the data is received from the information processing device, whether checked information from the information processing device is included in the received data, wherein
the checked information from the information processing device is added to the received data by the information processing device when the information processing device determines that the received data has been checked for viruses before sending the received data to the image forming device,
the hardware processor checks, upon determining that the checked information is not included in the received data, the received data for viruses, and
the hardware processor omits, upon determining that the checked information is included in the received data, the check for viruses in the received data.

12. The image forming device according to claim 11, further comprising:
a storage that stores device information, wherein
the hardware processor sends the device information to the information processing device when a request for the device information is received from the external information processing device.

13. The image forming device according to claim 12, wherein
the device information includes version information of a virus definition file that is to be used at the check for viruses.

14. The image forming device according to claim 12, wherein the device information includes group information relating to a group to which the image forming device belongs.

15. The image forming device according to claim 14, wherein
the group information includes network information relating to a network to which the image forming device is connected.

16. An image forming system comprising an information processing device and an image forming device that communicate with each other over a network, wherein
the information processing device comprises:
a storage that stores data; and
a first hardware processor that:
receives the data and stores the data in the storage;
checks the data for viruses when the data is received; and
sends the data stored in the storage to the image forming device, wherein
the first hardware processor determines whether the data has been checked for viruses before the data is sent to the image forming device, and
the first hardware processor adds, upon determining that the data has been checked for viruses, checked information to the data before the data is sent to the image forming device, and
the image forming device comprises:
a second hardware processor that:
receives the data from the information processing device;
produces a printed output based on the received data; and
determines, after the data is received from the information processing device, whether the checked information from the information processing device is included in the received data, wherein
the second hardware processor checks, upon determining that the checked information is not included in the received data, the received data for viruses; and
the second hardware processor omits, upon determining that the checked information is included in the received data, the check for viruses in the received data.

17. A virus check method applied to an image forming system that comprises an information processing device and an image forming device that communicate with each other over a network, the virus check method comprising:
determining by the information processing device, whether data to be sent from the information processing device to the image forming device has been checked by the information processing device for viruses before the data is sent;
adding by the information processing device, upon determining that the data has already been checked for viruses, checked information from the information processing device to the data to be sent before the data is sent;
determining by the image forming device, after the data sent from the information processing device is received by the image forming device, whether the checked information from the information processing device is included in the data that is received by the image forming device; and
checking by the image forming device, upon determining that the checked information is not included in the received data, the received data for viruses; and omitting by the image forming device, upon determining that the checked information is included in the received data, a check for viruses in the received data.

\* \* \* \* \*